United States Patent

Kim et al.

[11] Patent Number: 5,986,265
[45] Date of Patent: Nov. 16, 1999

[54] INFRARED OBJECT DETECTOR

[75] Inventors: Tae-ho Kim; Sung-soo Lee, both of Suwon, Rep. of Korea

[73] Assignee: Samsung Electronics Co., Ltd., Rep. of Korea

[21] Appl. No.: 08/921,619

[22] Filed: Sep. 2, 1997

[30] Foreign Application Priority Data

Nov. 5, 1996 [KR] Rep. of Korea ........................ 96-52164

[51] Int. Cl.⁶ .................................................. G01J 5/10
[52] U.S. Cl. ........................ 250/338.3; 250/353; 250/342; 250/221
[58] Field of Search ........................ 250/338.1, 338.3, 250/338.4, 338.2, 342, 349, 353, 221

[56] References Cited

U.S. PATENT DOCUMENTS

| | | | |
|---|---|---|---|
| 4,523,095 | 6/1985 | Keller-Steinbach | 250/349 |
| 4,697,081 | 9/1987 | Baker | 250/338.3 |
| 5,126,718 | 6/1992 | Doctor | 340/567 |
| 5,637,040 | 6/1997 | Kim et al. | 454/256 |

*Primary Examiner*—Constantine Hannaher
*Assistant Examiner*—Albert Gagliardi
*Attorney, Agent, or Firm*—Burns, Doane, Swecker & Mathis LLP

[57] ABSTRACT

Two pairs of pyroelectric devices are each mounted on a cone-shaped substrate to precisely control their alignment. Each cone-shaped substrate is a part of a sensor module which also supports an attenuator, along with a transistor and a resistor chip associated with each pyroelectric device of the pair. The sensor module is provided with a silicon filter through which infrared radiation is transmitted to the pair of pyroelectric devices. Each module is mounted in an inner space formed by two hemispherical lenses which serve to direct light to the module. Two such hemispherical lens-sensor modules are provided in a precise optical arrangement designed to operate in conjunction with associated circuitry in order to detect infrared radiation from any of six distinguishable zones. Applications of such a device include for example cameras and air conditioning systems.

5 Claims, 4 Drawing Sheets

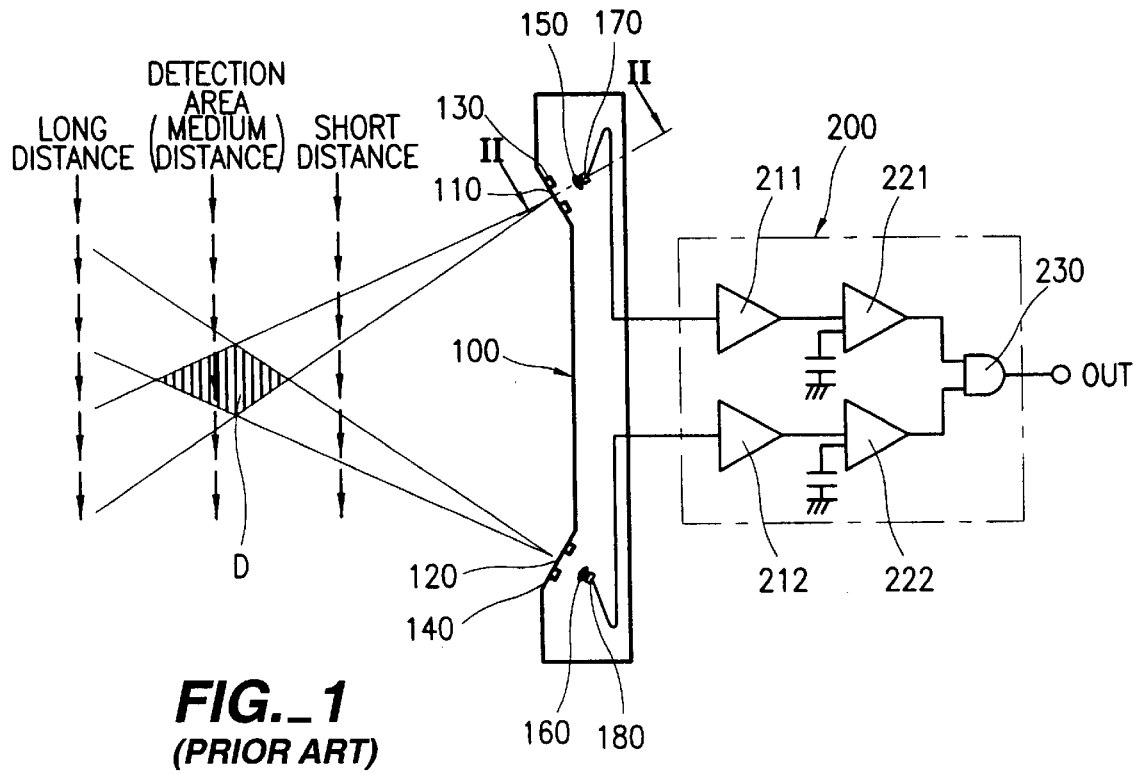
FIG._1
*(PRIOR ART)*
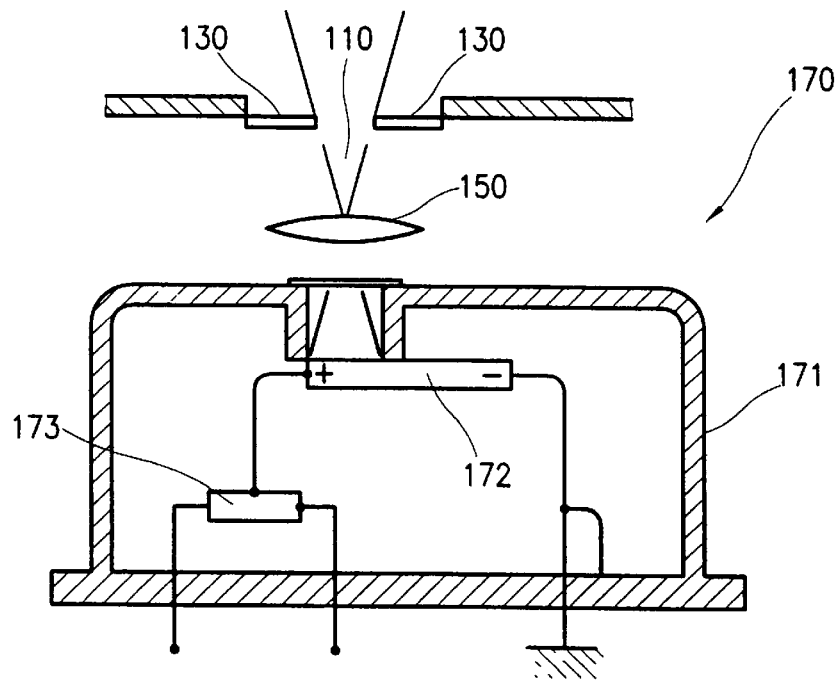
FIG._2
*(PRIOR ART)*

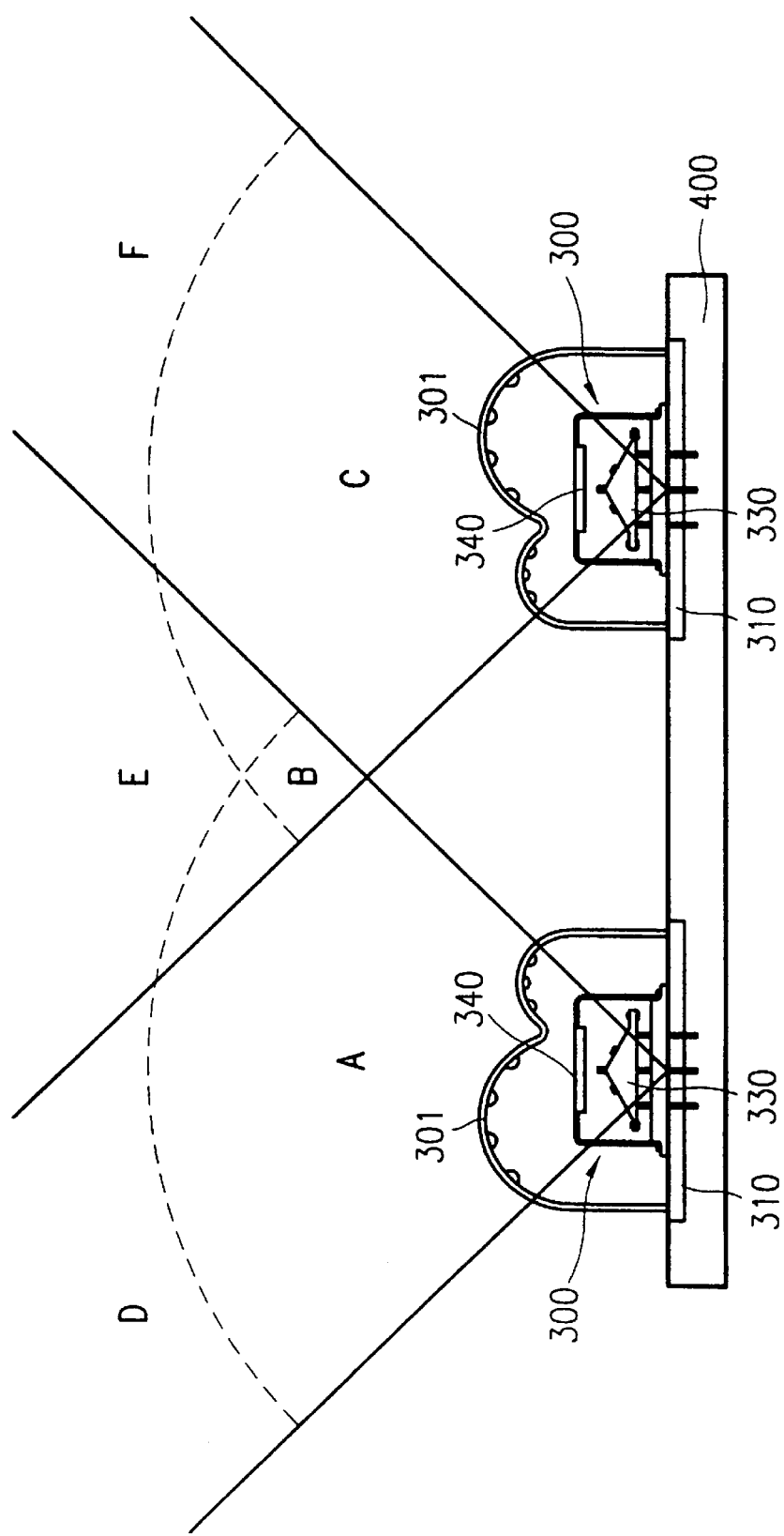
FIG._3

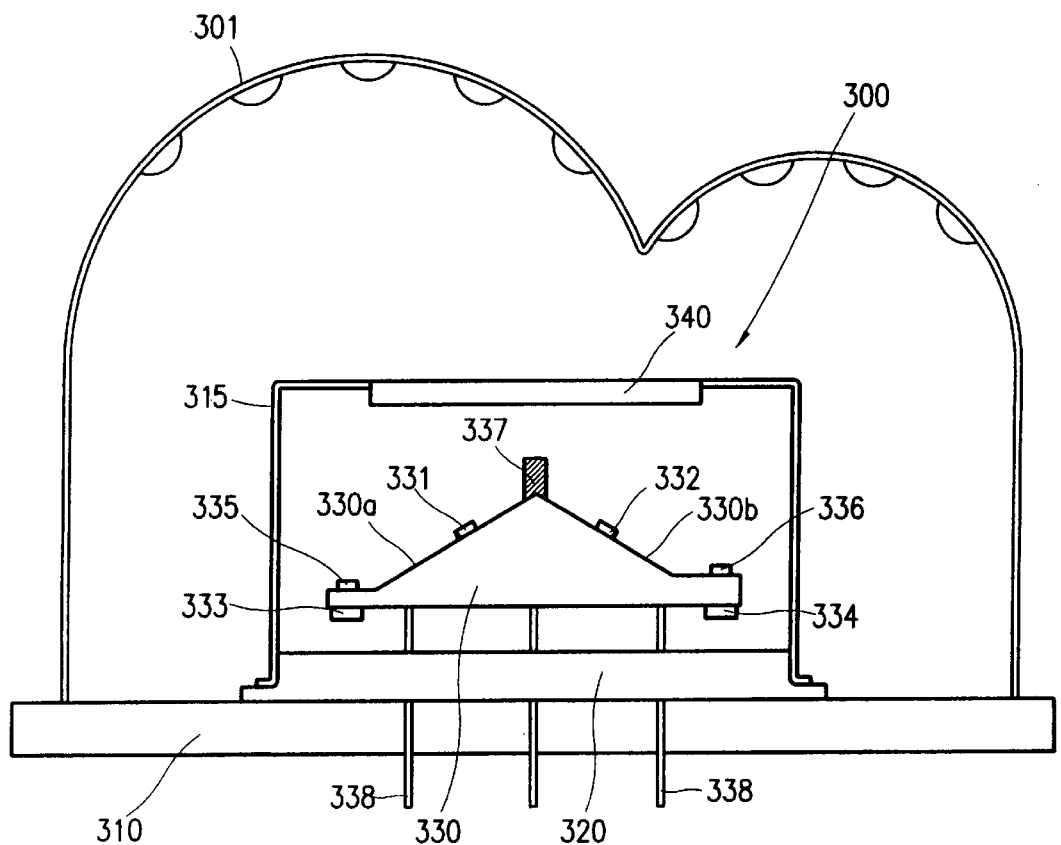
FIG._4
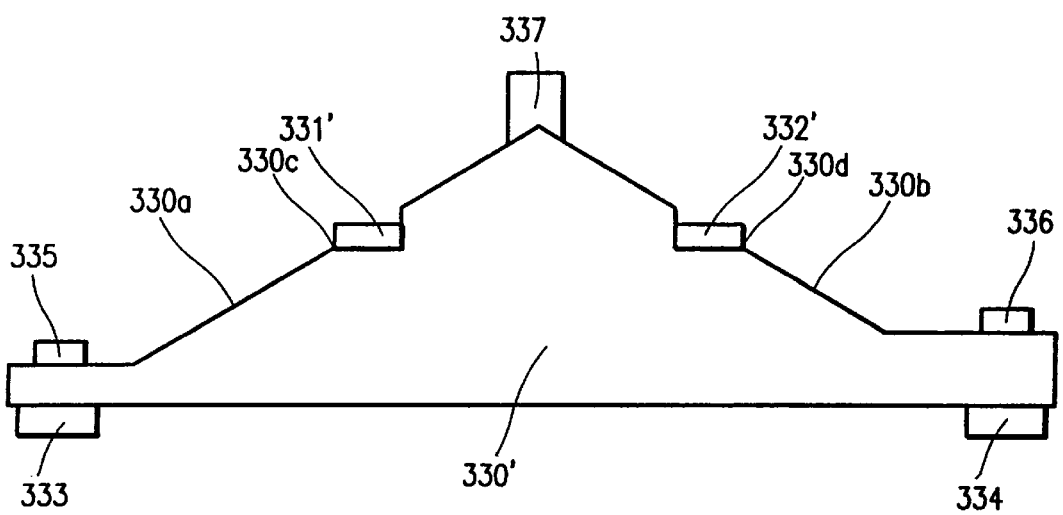
FIG._6

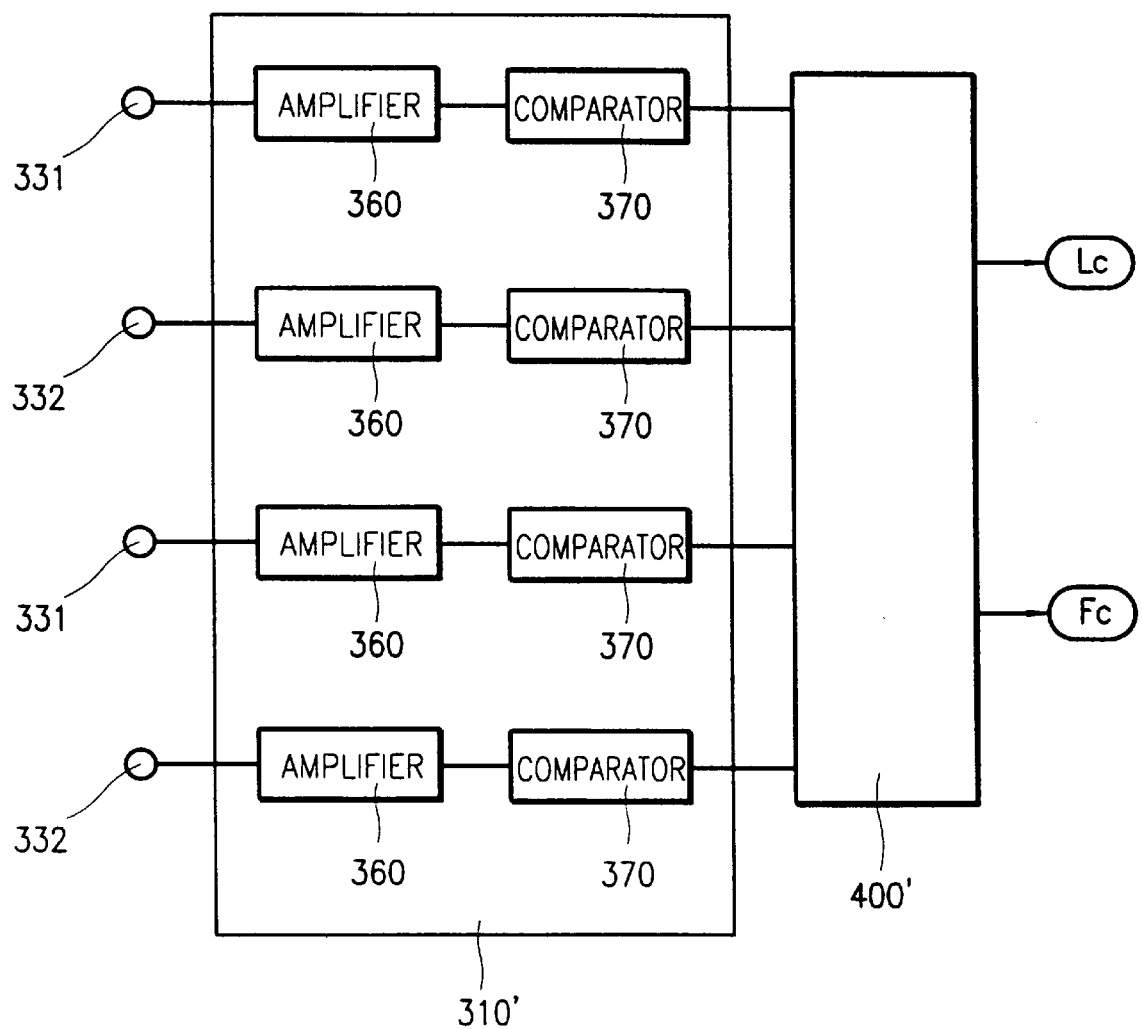
FIG._5

INFRARED OBJECT DETECTOR

BACKGROUND OF THE INVENTION

The present invention relates to an object detector employing an infrared pyroelectric device.

An object detector having an infrared sensor is generally used in a control device for an automatic door or in a burglar alarm system. Such an infrared object detector senses an object present in a specific detection area. FIG. 1 illustrates a conventional object detector disclosed in Japanese Patent laid-open Publication No. Heisei 4-324329. The conventional object detector has a sensor 100 for sensing an object and a signal processor 200 for signal-processing information of the sensed object.

Referring to FIG. 1, light receiving windows 110 and 120 are installed at frontal surfaces of both ends of the sensor 100, and hoods 130 and 140 are provided around the light receiving windows 110 and 120 to define the edges of light receiving views. Infrared lenses 150 and 160 and infrared sensor modules 170 and 180 connected to the signal processor 200 are disposed behind the light receiving windows 110 and 120, respectively.

Referring to FIG. 2, the infrared sensor module 170 includes a pyroelectric device 172 and a field effect transistor (FET) 173 in a case 171. Infrared light incident through the light receiving window 110 is detected by the pyroelectric device 172, which outputs a corresponding electrical signal. This signal is impedance-transformed by the FET 173 and then output to the signal processor 200 of FIG. 1.

Signals output from the infrared sensor modules 170 and 180 are amplified by amplifiers 211 and 212, respectively, of the signal processor 200, then sent to comparators 221 and 222. The outputs of the comparators 211 and 222 are processed by an AND gate 230. From the output of the AND gate 230 it can be determined whether an object exists in a detection area.

In the conventional infrared object detector as constituted above, a detection area D (see FIG. 1) in which an object can be detected is defined as where the light receiving views of the pair of light receiving windows 110 and 120 intersect each other. That is, when an object enters the detection area D, the periodic superimpositions of signals output from the infrared sensor modules 170 and 180 behind the respective light receiving windows 110 and 120 occur. Therefore, the absence or presence of an object in the detection area D can be determined.

However, if the object enter at a short or long distance from the sensor 100, the superimpositions of signals are not generated, thus making it difficult to determine the absence or presence of the object. Further, the presence of the object cannot be determined three-dimensionally because the detection area of the object is limited to two-dimensions. In addition, the sensor 100 having the sensor modules is too bulky, making utilization of the conventional infrared object detector difficult for small products such as a camcorder, and the output signal of the pyroelectric device varies greatly as ambient temperature changes, thereby lowering the reliability of the conventional infrared object detector used, for example, for optimum control of the output of an air conditioner.

SUMMARY OF THE INVENTION

To overcome the above problems of the prior art, an object of the present invention is to provide an infrared object detector for determining the location of an object in a detection area with greater accuracy, while setting three-dimensional areas and removing the effects of ambient temperature.

Another object of the present invention is to provide an infrared object detector for an air conditioner, which enables optimum output of an air conditioner by determining the location of an object in a detection area with greater accuracy, while setting three-dimensional areas and removing the effects of ambient temperature.

To achieve the above object, there is provided an infrared object detector comprising: a pair of light receiving lenses each formed of two hemispherical lenses and each installed on a surface of a printed circuit board and having an inner space; an infrared sensor module installed within the inner space, electrically connected to the printed circuit board, and having a cone-shaped insulation substrate, a pair of pyroelectric devices installed on the conical surface of the cone-shaped insulation substrate, at opposite sides, respectively, a pair of field effect transistors (FETs) installed on respective portions of the cone-shaped insulation substrate, a pair of resistor chips installed respectively beneath the cone-shaped insulation substrate, corresponding to the FETs, a silicon filter positioned between the light receiving lenses and the cone-shaped insulation substrate, and a sealing member for sealing the inner space; and a signal processor provided on the printed circuit board, for processing a signal output from the infrared sensor module, wherein the location of an object positioned in a detection area defined as the intersection of the light receiving views of the light receiving lenses is determined by the signal output of the signal processor.

To achieve another object, there is provided an infrared object detector for an air conditioner, comprising: a pair of light receiving lenses each formed of two hemispherical lenses and each installed on a surface of a printed circuit board and having an inner space; an infrared sensor module installed in the inner space, electrically connected to the printed circuit board, and having a cone-shaped insulation substrate, a pair of pyroelectric devices installed on the conical surface of the cone-shaped insulation substrate, at opposite sides, respectively, a pair of field effect transistors (FETs) installed on respective portions of the cone-shaped insulation substrate, a pair of resistor chips installed respectively beneath the cone-shaped insulation substrate, corresponding to the resistor chips, a silicon filter positioned between the light receiving lenses and the cone-shaped insulation substrate, and a sealing member for sealing the inner space; and a signal processor provided on the printed circuit board, for processing a signal output from the infrared sensor module; and a microcomputer for determining the location of an object located in a detection area defined as the intersection of the light receiving views of the light receiving lenses by a signal output from the signal processor, and outputting a signal for controlling the operation of an air conditioner according to the determination.

BRIEF DESCRIPTION OF THE DRAWINGS

The above objects and advantages of the present invention will become more apparent by describing in detail preferred embodiments thereof with reference to the attached drawings in which:

FIG. 1 is a schematic diagram of a conventional infrared object detector;

FIG. 2 is a sectional view of the infrared sensor module of the conventional infrared object detector shown in FIG. 1;

FIG. 3 is a plan view showing an infrared object detector according to the present invention and detection areas of an object;

FIG. 4 is a sectional view of an infrared sensor module provided in the infrared object detector of the present invention;

FIG. 5 is a schematic block diagram showing the infrared object detector of the present invention applied to an air conditioner; and FIG. 6 is a sectional view of an insulation substrate adopted in the infrared object detector according to another embodiment of the present invention.

DETAILED DESCRIPTION OF THE INVENTION

Referring to FIG. 3, an infrared object detector of the present invention includes a pair of light receiving lenses 301, a pair of infrared sensor modules 300 installed within the light receiving lenses 301, and a printed circuit board 310 having a signal processor for processing signals output from the infrared sensor modules 300.

The light receiving lenses 301 each are formed of two hemispherical lenses or two Fresnel lenses.

As shown in FIG. 4, the infrared sensor modules 300 each include a cone-shaped insulation substrate 330 substantially enclosed in a region defined by a housing 315, the substrate 300 having a conical surface 330a, a pair of pyroelectric devices 331 and 332 installed on the conical surface 330a of the insulation substrate 330, at opposite sides, respectively, a pair of resistor chips 333 and 334 beneath the insulation substrate 330, a pair of FETs 335 and 336 provided on the insulation substrate 330 corresponding to the resistor chips 333 and 334, respectively, and a silicon filter 340 disposed between the light receiving lens 301 and the insulation substrate 330. The insulation substrate 330 is sealed within the region defined by housing 315 by a sealing member 320, and electrically connected to the printed circuit board 310 by lead pins 338.

The insulation substrate 330 is formed of an insulation material such as alumina or FR4, and an attenuator 337 is installed at the tip of the conical surface 330a. In addition, the pyroelectric devices 331 and 332 are each thin films or thin pieces of, for example, PZT, PLT, or a polymer.

The infrared object detector of the present invention as constituted above may have a plurality of detection areas A, B, C, D, E, and F as shown in FIG. 3, allowed by the light receiving lenses 301 each formed of two hemispherical lenses and the cone shape of the insulation substrate 330. That is, areas A and C including area B, where the light receiving views of the light receiving lenses 301 intersect each other, are defined as a short distance detection area. Also, areas D and F including area E, where the light receiving views intersect each other, are defined as a long distance detection area. For example, when an object such as a human being exists in area D, E, or F, thermal energy transmitted through the silicon filter 340 of FIG. 4 is smaller than when the object exists in area A, B, or C. On this basis, voltages from the pyroelectric devices 331 and 332 are compared by the signal processor of the printed circuit board 310 to thereby determine the presence or absence of an object at a long distance detection area.

The cone shape of the insulation substrate 330 prevents mutual interference between the intensity of light, received at the opposite sides of the conical surface 330a, and thermal energy, thus excluding influences of ambient temperature. The attenuator 337 provided at the tip of the conical surface 330a further reduces the influences of ambient temperature.

As shown in FIG. 3, the infrared object detector of the present invention is connected to a main circuit board of a device body 400 such as an air conditioner or a camcorder. FIG. 5 illustrates the case where the infrared object detector of the present invention is connected to an air conditioner. A signal processor 310' of the printed circuit board 310 of FIG. 3 for the infrared object detector is connected to a microcomputer 400' of the air conditioner. The signal processor 310' includes amplifiers 360 connected respectively to the pyroelectric devices 331 and 332 in each of the infrared sensor modules 331 and 332, and comparators 370 connected to the amplifiers 360, respectively. In such a structure, for example, in case a person is positioned in one of the detection areas shown in FIG. 3, the pyroelectric devices 331 and 332 sense a temperature variation in the area and convert the temperature variation into an electrical signal. The amplifiers 360 receive the electrical signal and amplify it. The comparators 370 convert the amplified signal into a digital signal which is received by the microcomputer 400'. Then, the signal is processed by a program included in the microcomputer 400' so that a determination of whether a person is in a detection area in a short, medium, or long distance is made. According to the determination, which represents the number, position, and movement of persons, the microcomputer 400' controls the air conditioner to operate in an effective manner. This could be done by outputting a louver signal $L_c$ to direct air to occupied areas, or a signal $F_c$ to control the rotational speed of a fan. Therefore, the air conditioner always operates most effectively in changing indoor conditions.

Meanwhile, FIG. 6 illustrates an insulation substrate 330' adopted in an infrared object detector according to another embodiment of the present invention. Here, like reference numerals denote the same components as those in the aforementioned drawings. As shown, horizontal portion 330c is formed on the conical surface 330a of the insulation substrate 330', mid-way between the tip and base. Pyroelectric devices 331' and 332' are installed on the horizontal portion 330c, at opposite sides respectively.

As described above, the infrared object detector enables setting of three-dimensional detection areas by the light receiving lenses formed of two hemispherical lenses and the cone-shaped insulation substrate, and determines the location of an object in a detection area with greater accuracy, while removing the influences of ambient temperature. In addition, in case the infrared object detector of the present invention is employed in, for example, an air conditioner, it is possible to determine the location of an object, thus controlling the air conditioner to operate most effectively. Furthermore, since the infrared object detector of the present invention can be made smaller than the conventional one, it can determine the location of an object more accurately when applied to a camera or a camera-integrated video.

What is claimed is:

1. An infrared object detector comprising:

a pair of physically distinct and separate light receiving lenses each formed of two hemispherical lenses and each installed on a surface of a printed circuit board and having an inner space;

an infrared sensor module installed within said inner space, electrically connected to said printed circuit board, and having a cone-shaped insulation substrate, a pair of pyroelectric devices installed on the conical surface of said cone-shaped insulation substrate, at opposite sides, respectively, a pair of field effect transistors (FETs) installed on respective portions of said cone-shaped insulation substrate, a pair of resistor chips installed respectively beneath said cone-shaped insulation substrate, corresponding to said FETs, a silicon filter positioned between said light receiving lenses and said cone-shaped insulation substrate, and a sealing member for sealing said sensor module; and a signal processor provided on said printed circuit board, for processing a signal output from said infrared sensor module, wherein the location of an object positioned in a detection area defined as the intersection of the light receiving views of said light receiving lenses is determined by the signal output of said signal processor.

2. An infrared object detector as claimed in claim 1, wherein a horizontal portion is formed on the conical surface of said cone-shaped insulation substrate, mid-way between the tip and base of said cone-shaped insulation substrate, and said pyroelectric devices are installed on said horizontal portion.

3. An infrared object detector as claimed in claim 1, wherein an attenuator is installed at the tip of said cone-shaped insulation substrate.

4. An infrared object detector as claimed in claim 1, wherein said cone-shaped insulation substrate is formed of alumina.

5. An infrared object detector for an air conditioner, comprising:

a pair of physically distinct and separate light receiving lenses each formed of two hemispherical lenses and each installed on a surface of a printed circuit board and having an inner space;

an infrared sensor module installed in said inner space, electrically connected to said printed circuit board, and having a cone-shaped insulation substrate, a pair of pyroelectric devices installed on the conical surface of said cone-shaped insulation substrate, at opposite sides, respectively, a pair of field effect transistors (FETs) installed on respective portions of said cone-shaped insulation substrate, a pair of resistor chips installed respectively beneath said cone-shaped insulation substrate, corresponding to said resistor chips, a silicon filter positioned between said light receiving lenses and said cone-shaped insulation substrate, and a sealing member for sealing said sensor module;

a signal processor provided on said printed circuit board, for processing a signal output from said infrared sensor module; and a microcomputer for determining the location of an object located in a detection area defined as the intersection of the light receiving views of said light receiving lenses by a signal output from said signal processor, and outputting a signal for controlling the operation of an air conditioner according to the determination.

* * * * *